(12) United States Patent
Lu et al.

(10) Patent No.: US 11,706,791 B2
(45) Date of Patent: Jul. 18, 2023

(54) DATA PROCESSING METHOD AND DEVICE, AND STORAGE MEDIUM

(71) Applicant: GUANGDONG OPPO MOBILE TELECOMMUNICATIONS CORP., LTD., Guangdong (CN)

(72) Inventors: Qianxi Lu, Guangdong (CN); Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/340,009

(22) Filed: Jun. 5, 2021

(65) Prior Publication Data
US 2021/0298032 A1 Sep. 23, 2021

Related U.S. Application Data

(63) Continuation of application No. PCT/CN2018/121322, filed on Dec. 14, 2018.

(51) Int. Cl.
*H04W 72/00* (2023.01)
*H04W 72/543* (2023.01)

(52) U.S. Cl.
CPC .............................. *H04W 72/543* (2023.01)

(58) Field of Classification Search
CPC ...................... H04W 72/087; H04W 28/0268
See application file for complete search history.

(56) References Cited

U.S. PATENT DOCUMENTS

| 11,178,569 | B2 * | 11/2021 | Mok | H04L 1/0017 |
| 2018/0324631 | A1 | 11/2018 | Jheng et al. | |
| 2019/0174522 | A1 * | 6/2019 | Xiao | H04W 72/04 |
| 2019/0268973 | A1 * | 8/2019 | Bull | H04W 92/02 |
| 2020/0037190 | A1 * | 1/2020 | Wu | H04W 24/10 |
| 2021/0084542 | A1 * | 3/2021 | Ahmad | H04W 28/24 |
| 2021/0168647 | A1 * | 6/2021 | Li | H04W 28/0278 |
| 2021/0219168 | A1 * | 7/2021 | Liu | H04W 28/02 |
| 2021/0410129 | A1 * | 12/2021 | Freda | H04W 72/087 |

FOREIGN PATENT DOCUMENTS

| CN | 102291763 A | 12/2011 |
| CN | 108809596 A | 11/2018 |
| KR | 20180111409 A | 10/2018 |
| TW | 201836330 A | 10/2018 |

(Continued)

OTHER PUBLICATIONS

Mediatek Inc. "SA WG2 Meeting #121", pCR 23.501 UE Support for Concurrent QoS Rules, S2-173143, Mar. 31, 2017 (Mar. 31, 2017).

(Continued)

*Primary Examiner* — Rhonda L Murphy
(74) *Attorney, Agent, or Firm* — Perkins Coie LLP

(57) ABSTRACT

Disclosed is a data processing method, comprising: a first terminal device mapping data to a quality-of-service flow or a side-link bearer according to a first configuration; and a second terminal device sending the first configuration to the first terminal device, wherein the first configuration is used for the first terminal device to map data to the quality-of-service flow or the side-link bearer. Further disclosed are a terminal device and a storage medium.

16 Claims, 2 Drawing Sheets

(56) References Cited

FOREIGN PATENT DOCUMENTS

WO 2018059592 A1 4/2018

OTHER PUBLICATIONS

International Search Report in the international application No. PCT/CN2018/121322, dated Aug. 30, 2019.
3GPP TSG RAN Meeting #80 RP-181480, La Jolla, USA, Jun. 11-14, 2018, Source: Vodafone; Title: New SID: Study on NR V2X; Document for: Approval; Agenda Item: 9.1.5.
Ericsson, "QoS principles", 3GPP TSG-RAN WG2 #103-Bis TDoc R2-1815043, Chengdu, China, Oct. 8-12, 2018. 4 pages.
Huawei, HiSilicon, "QoS management for NR V2X", 3GPP TSG RAN WG1 Meeting #95 R1-1812214, Spokane, USA, Nov. 12-16, 2018. 4 pages.
Supplementary European Search Report in the European application No. 18942804.8, dated Nov. 5, 2021. 10 pages.
Office Action of the Indian application No. 202117029939, dated Feb. 28, 2022. 5 pages with English Translation.
Written Opinion of the International Search Authority in the international application No. PCT/CN2018/121322, dated Aug. 30, 2019. 7 pages with English Translation.
First Office Action of the Chinese application No. 202110542237.2, dated Aug. 17, 2022. 14 pages with English translation.
Huawei et al., "Radio bearer configuration and management for NR sidelink", 3GPP TSG-RAN WG2 Meeting #104 R2-1816522, Spokane, USA, Nov. 12-16, 2018. 5 pages.
Zte et al., "Consideration on QoS management for NR V2X", 3GPP TSG-RAN WG2 #104 R2-1816988, Spokane, USA, Nov. 12-16, 2018. 4 pages.
Catt, "Procedure on QoS Support over PC5 interface", 3GPP SA WG2 Meeting #128bis S2-188558(revision of S2-188159), Aug. 20-24, 2018, Sophia Antipolis, France. 4 pages.
Huawei et al., "Potential RAN2 impacts on gNB scheduled resource allocation for NR V2X", 3GPP TSG-RAN WG2 # 104 R2-1816518, Spokane, USA, Nov. 12-16, 2018. 5 pages.
Intel Corporation et al., "Updates to stage 2 QoS flow", 3GPP TSG-RAN WG2 Meeting #100 R2-1712687, Reno, Nevada, USA, Nov. 27-Dec. 1, 2017. 8 pages.
First Office Action of the Japanese application No. 2021-533168, dated Sep. 27, 2022. 8 pages with English translation.
RAN2, "LS on TX Profiles Provisioning", SA WG2 Meeting #S2-129BIS S2-1811617(revision of S2-1811220), Nov. 26-30, 2018, West Palm Beach, USA. SA WG2 Meeting #S2-129 S2-1811220, Oct. 15-19, 2018, Dongguan, P.R. China. 3GPP TSG-RAN WG2 #103-Bis TDoc R2-1815665, Chengdu, China, Oct. 8-12, 2018. 1 page.
Supplementary European Search Report in the European application No. 22188851.4, dated Oct. 24, 2022. 13 pages.

\* cited by examiner

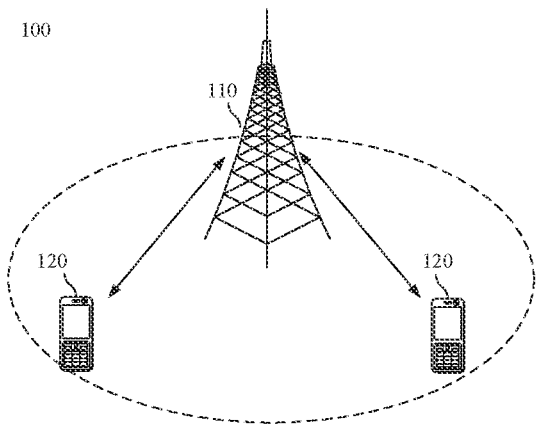
FIG. 1
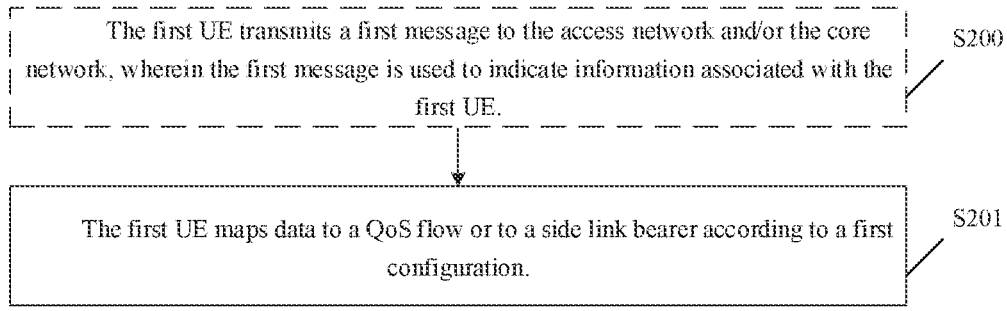
FIG. 2
The second UE transmits a first configuration to a first UE, wherein the first configuration is used by the first UE to map data to a QoS flow or to a side link bearer. — S301
FIG. 3
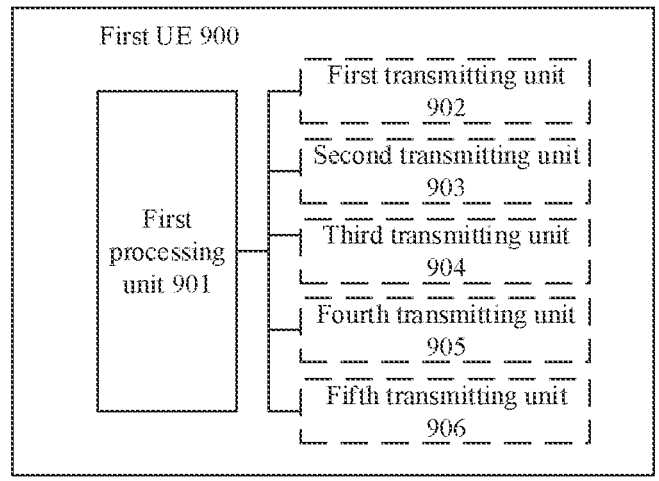
FIG. 4

DATA PROCESSING METHOD AND DEVICE, AND STORAGE MEDIUM

CROSS-REFERENCE TO RELATED APPLICATIONS

This is a continuation application of International Patent Application No. PCT/CN2018/121322, filed on Dec. 14, 2018, disclosures of which are incorporated herein by reference in their entity.

BACKGROUND

In the Vehicle to Everything (V2X) of the 5th-Generation (5G) New Radio (NR) system, the concepts of Quality of Service (QoS) flow or QoS bearer are introduced. However, there is no effective solution for how to implement the mapping of data to the QoS flow or data to the side link bearer.

SUMMARY

The disclosure relates to the technical field of wireless communications, and particularly, to a method and a device for processing data, and a storage medium.

A first aspect provides a method for data processing, including: mapping, by a first User Equipment (UE), data to a Quality of Service (QoS) flow at a V2X layer according to a first configuration: and transmitting, by the first UE, a first information to an access layer, wherein the first information at least comprises an identification associated with the QoS flow.

A second aspect provides a method for data processing, including: transmitting, by a second UE, a first configuration to a first UE, wherein the first configuration is for the first UE to map data to a QoS flow.

A third aspect provides a first User Equipment (UE) including: a processor, configured to map data to a Quality of Service (QoS) flow at a V2X layer according to a first configuration; and a transceiver, configured to transmit a first information to an access layer, wherein the first information at least comprises an identification associated with the QoS flow.

The embodiments of the disclosure provide a method for processing data, with which the first UE may map the data to the QoS flow or to the side link bearer, thereby realizing the mapping of the data to the QoS flow or the data to the side link bearer.

BRIEF DESCRIPTION OF THE DRAWINGS

FIG. 1 is a schematic structure diagram of a communication system according to an embodiment of the disclosure.

FIG. 2 is a diagram of an optional processing flow of the method for processing data according to an embodiment of the disclosure.

FIG. 3 is a diagram of optional processing flow of the method for processing data according to another embodiment of the disclosure.

FIG. 4 is a schematic structure diagram of a first User Equipment (UE) according to an embodiment of the disclosure.

DETAILED DESCRIPTION

Figure 5:
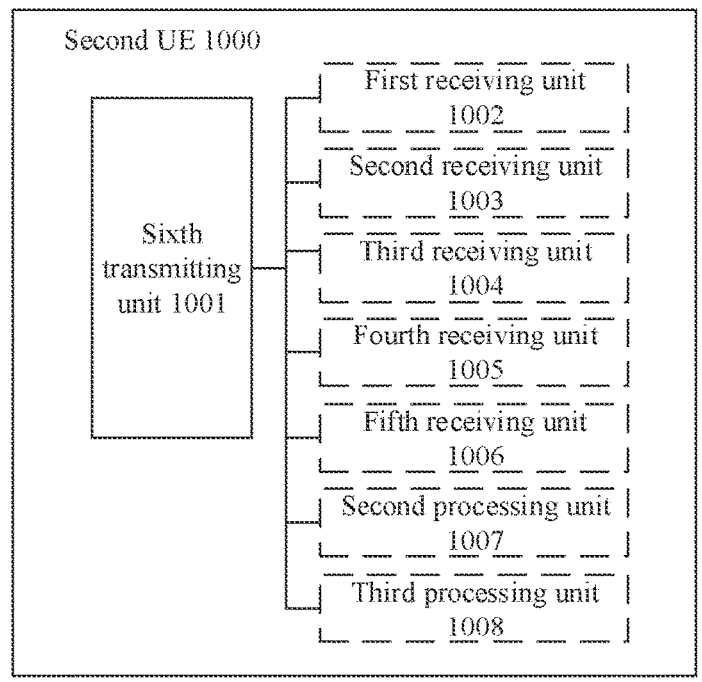
FIG. 5 is a schematic structure diagram of a second User Equipment (UE) according to an embodiment of the disclosure.

For a more detailed understanding of the features and technical content of the embodiments of the disclosure, the implementation of the embodiments of the disclosure will be described in detail below with reference to the accompanying drawings. The accompanying drawings are only for reference and explanation purposes, and are not intended to limit the embodiments of the disclosure.

Before describing the embodiments of the disclosure in detail, firstly, in the Vehicle to Everything (V2X) of the Long Term Evolution (LTE) system, the parameter (such as PPPP and PPPR) associated with the QoS of per-packet is provided to the access layer by the disclosure layer and the V2X layer, then the access layer autonomously performs the mapping of the packet to the radio bearer; and the network side does not configure the mapping of the packet to the radio bearer.

The disclosure provides a method for processing data, and the method of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a 5G system.

Exemplarily, the communication system 100 applied to the embodiments of the disclosure is illustrated in FIG. 1. The communication system 100 may include a network device 110. The network device 110 may be a device communicating with a terminal device 120 (or referred to as a communication terminal or a terminal). The network device 110 may provide communication coverage for a specific geographical region and may communicate with a terminal device within the coverage. Optionally, the network device 110 may be a Base Transceiver Station (BTS) in the GSM or CDMA system, may also be a NodeB (NB) in the WCDMA system, and may further be an Evolutional Node B (eNB or eNodeB) in the LTE system or a wireless controller in a Cloud Radio Access Network (CRAN). Or the network device may be a mobile switching center, a relay station, an access point, a vehicle-mounted device, a wearable device, a hub, a switch, a network bridge, a router, a network-side device in 5G network, a network device in a future evolutionary Public Land Mobile Network (PLMN) or the like.

The communication system 100 further includes at least one terminal device 120 within the coverage of the network device 110. As used herein, the "terminal device" includes, but is not limited to, being connected via a wireline, for example, being connected via a Public Switched Telephone Networks (PSTN), a Digital Subscriber Line (DSL), a digital cable, and a direct cable; and/or another data connection/network; and/or being connected via a wireless interface, for example, being connected via a cellular network, a Wireless Local Area Network (WLAN), a digital TV network such as a DVB-H network, a satellite network, an Amplitude Modulation-Frequency Modulation (AM-FM) broadcast transmitter; and/or an equipment of another terminal device, wherein the equipment is configured to receive/transmit a communication signal; and/or an Internet of Things (IoT) device. The terminal device configured to communicate through a wireless interface may be referred to as a "wireless communication terminal", a "wireless terminal" or a "mobile terminal". Examples of the mobile terminal include, but are not limited to, a satellite phone or a cellular phone; a Personal Communications System (PCS) terminal that may combine the cellular radio phone with data processing, fax, and data communication; a Personal Digital Assistant (PDA) that may include radio telephone, pager, Internet/intranet access, Web browser, memo pad, calendar, and/or Global Positioning System (GPS) receiver; and a conventional laptop and/or a palmtop receiver or other electronic devices including radio telephone transceiver. The terminal device may refer to an access terminal, a UE, a user unit, a user station, a mobile station, a mobileplatform, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a PDA, a handheld device with a wireless communication function, a computing device, another processing device connected to a wireless modem, a vehicle-mounted device, a wearable device, a terminal device in 5G network, a terminal device in the future evolutionary PLMN or the like.

Optionally, the terminal devices 120 may perform Device to Device (D2D) communication therebetween.

Optionally, the 5G system or 5G network may also be referred to as a New Radio system or an NR network.

One network device and two terminal devices are exemplarily shown in FIG. 1. Optionally, the communication system 100 may include multiple network devices and another number of terminal devices may be included within the coverage of each network device. There are no limits made thereto in the embodiments of the disclosure.

Optionally, the communication system 100 may further include another network entity such as a network controller and a mobility management entity. There are no limits made thereto in the embodiments of the disclosure.

It is to be understood that the device with a communication function in the network/system in the embodiments of the disclosure may be referred to as a communication device. Taking the communication system 100 illustrated in FIG. 1 as an example, the communication device may include a network device 110 and a terminal device 120 which are with communication functions. The network device 110 and the terminal device 120 may be the specific devices described above and are not further elaborated herein. The communication device may also include other devices in the communication system 100, for example, may also include other network entities such as a network controller, and a mobility management entity, which are not limited in the embodiments of the disclosure.

An optional processing flow of the method for processing data according to an embodiment of the disclosure, as illustrated in FIG. 2, includes Step S201.

At Step S201, the first UE maps data to a Quality of Service (QoS) flow or to a side link bearer according to a first configuration.

In some embodiments, firstly, the first UE maps the data to a corresponding QoS flow at a V2X layer according to the first configuration. Then the first UE maps the QoS flow to a corresponding side link bearer at an access layer.

Optionally, after the first UE mapped the data to the corresponding QoS flow at the V2X layer, the first UE further transmits a first message to the access layer, wherein the first message at least includes an identification associated with the QoS flow, such as a QoS flow Identifier (ID).

Or, after the first UE mapped the data to the corresponding QoS flow at the V2X layer, the first UE further transmits a first message to an access layer, wherein the first message at least includes a corresponding relationship between the QoS flow and at least one of a QoS attribute, a transmission parameter configuration, a transmission mode configuration, a resource address or a target address. Optionally, the QoS attribute is V2X 5G QoS Indicator (VQI), the transmission mode configuration includes: broadcast, multicast, or unicast, and the transmission parameter configuration is TX profile. Herein, the corresponding relationship between the QoS flow and at least one of a QoS attribute, a transmission parameter configuration, a transmission mode configuration, a resource address or a target address may indicate how to acquire the QoS flow. For example, if the first message includes the corresponding relationship between the QoS flow and the QoS attribute, and the QoS attribute is VQI, the corresponding relationship is used to indicate that the QoS flow is acquired based on VQI.

Or, after the first UE mapped the data to the corresponding QoS flow at the V2X layer, the first UE further transmits a first message to an access layer, wherein the first message at least includes an identification associated with the QoS flow, and the corresponding relationship between the QoS flow and at least one of a QoS attribute, a transmission parameter configuration, a transmission mode configuration, a resource address or a target address.

In other embodiments, the first UE maps directly the data to the corresponding side link bearer at the V2X layer according to the first configuration.

Optionally, the first UE also transmits a second message to an access layer, wherein the second message at least includes an identification associated with the side link bearer, such as a side link bearer ID.

Or, the first UE also transmits a second message to an access layer, wherein the second message at least includes a corresponding relationship between the side link bearer and at least one of a QoS attribute, a transmission parameter configuration, a transmission mode configuration, a resource address or a target address. Herein, the corresponding relationship between the side link bearer and at least one of a QoS attribute, a transmission parameter configuration, a transmission mode configuration, a resource address or a target address may indicate how to acquire the side link bearer. For example, if the first message includes the corresponding relationship between the side link bearer and the transmission parameter configuration, the corresponding relationship is used to indicate that the side link bearer is acquired based on the transmission parameter configuration.

Or, the first UE also transmits a second message to an access layer, the second message at least includes an identification associated with the side link bearer, and the corresponding relationship between the side link bearer and at least one of a QoS attribute, a transmission parameter configuration, a transmission mode configuration, a resource address or a target address.

In some other embodiments, the first UE maps the data to a corresponding side link bearer at an access layer according to the first configuration.

In the embodiment of the disclosure, the first configuration may be a pre-configuration of the first UE, that is, the first configuration is pre-configured in the first UE. Or, the first configuration may be transmitted to the first UE by the access network element. Or, The first configuration may be transmitted to the first UE by the core network element. Or, The first configuration may be transmitted to the first UE by a second UE, wherein the second UE is a UE different from the first UE.

Herein, the access network element is a base station, such as a gNB or eNB. The core network element is an Access and Mobility Management Function (AMF) entity, a Policy Control Function (PCF) entity, a V2X entity, or Mobility Management Entity (MME) entity.

In the embodiment of the disclosure, the first configuration can be obtained through at least one of a Radio Resource Control (RRC) signaling, a PC5 RRC signaling, a PC5 signaling, a PC5 Service Data Adaption Protocol (SDAP) layer header, a PC5 SDAP layer signaling, or a Non-Access Stratum (NAS) signaling. For example, the access layer entity obtains the first configuration according to the RRC signaling, or the V2X entity obtains the first configuration according to the PC5 SDAP layer signaling, or the access layer entity obtains the first part of information of the first configuration according to the RRC signaling, the V2X entity obtains the second part of information of the first configuration, and the first part of information and the second part of information form together the complete first configuration.

In the embodiment of the disclosure, the first configuration has an input parameter and an output parameter. The input parameter of the first configuration includes at least one of a Provider Service Identifier (PSID)/an Intelligent Transport System-Application Identification (ITS-AID), a source address, a target address, a QoS attribute, a transmission parameter configuration or a transmission mode configuration. The output parameter of the first configuration includes at least one of a QoS flow ID, a side link bearer ID, a logical channel ID, a QoS attribute, a transmission parameter configuration or a transmission mode configuration. Herein, there is a corresponding relationship between the input parameter of the first configuration and the output parameter of the first configuration. For example, when the input parameters are the source address, the target address and the transmission mode configuration, the source address is A, the target address is B, and the transmission mode is configured as C, then the corresponding output parameters are the side link bearer ID, the logical channel ID and the transmission mode configuration, the side link bearer ID is D', the logical channel ID is E', and the transmission mode is configured as F', wherein A, B, C, D', E' and F' are specific values of their corresponding parameters.

Optionally, the first configuration is used to indicate a mapping relationship from the QoS flow to the side link bearer. In this case, the first UE maps the QoS flow to the side link bearer at the access layer according to the instruction of the first configuration.

Optionally, the first configuration is used to indicate a mapping relationship from the data to the QoS flow, where the mapping relationship is determined at least based on at least one of a PSID/an ITS-AID or a QoS attribute. In this case, the first UE maps the data to the corresponding QoS flow at the V2X layer; and the mapping of the data to the corresponding QoS flow is determined based on the PSID/ITS-AID and/or the QoS attribute.

Optionally, the first configuration is used to indicate a mapping relationship from the data to the side link bearer, wherein the mapping relationship is determined at least based on at least one of a PSID/an ITS-AID or a QoS attribute. In this case, the first UE maps the data to the corresponding side link bearer at the V2X layer or at the application layer; and the mapping of the data to the corresponding side link bearer is determined based on the PSID/ITS-AID and/or the QoS attribute.

Optionally, the first configuration is used to indicate the mapping of data that satisfies a first condition to at least one of the first QoS flow or the first side link bearer. In this case, the first QoS flow may be a default QoS flow, and the first side link bearer may be a default side link bearer. The first condition includes at least one of: a PSID, an ITS-AID, a QoS attribute, and a QoS flow ID.

Optionally, before performing Step S201, the method further includes Step S200.

At Step S200, the first UE transmits a first message to the access network and/or the core network, wherein the first message is used to indicate the information associated with the first UE.

In the embodiment of the disclosure, the first message includes at least one of: a PSID/ITS-AID, a source address, a target address, a QoS attribute, a QoS flow ID, a transmission parameter configuration, or a transmission mode configuration.

Optionally, in the embodiment of the disclosure, the method further includes the following steps wherein:

the core network element transmits a second message to the access network element, the second message is used to indicate the information associated with the first UE. The information associated with the first UE includes at least one of: a PSID/ITS-AID, a source address, a target address, a QoS attribute, a QoS flow ID, a transmission parameter configuration, or a transmission mode configuration.

It should be noted that in the embodiment of the disclosure, mapping the data to the radio link bearer may be also understood as mapping the data to the logical channel. Mapping the QoS flow to the radio link bearer may be also understood as mapping the QoS flow to the logical channel.

An optional processing flow of the method for processing data according to another embodiment of the disclosure, as illustrated in FIG. 3, includes Step S301.

At Step S301, the second UE transmits a first configuration to a first UE, wherein the first configuration is for the first UE to map data to a QoS flow or to a side link bearer.

In the embodiment of the disclosure, the explanation related to the first configuration is the same as the explanation related to the first configuration at Step S201, and are not further elaborated herein.

In some embodiments, before Step S301, the method further includes Step S300*a* and Step S300*b*.

At Step S300*a*, the second UE transmits a third message to at least one of an access network element or a core network element, wherein the third message is used to indicate information associated with the first UE.

The third message includes at least one of: a PSID/an ITS-AID, a source address, a target address, a QoS attribute, a QoS flow ID, a transmission parameter configuration or a transmission mode configuration. Optionally, the transmission mode configuration includes: broadcast, multicast, or unicast, and the transmitting parameter is configured as TX profile.

In some embodiments, the third message is for the core network element to determine a mapping relationship from the data of the first UE to the QoS flow. Or, the third message is for the access network element to determine a mapping relationship from the QoS flow of the first UE to the side link bearer. Or, the third message is for the core network element to determine the mapping relationship from the data of the first UE to the QoS flow, and the third message is for the access network element to determine the mapping relationship from the QoS flow of the first UE to the side link bearer.

At Step S300b, the second UE receives a fourth message transmitted by at least one of an access network element or a core network element, wherein the fourth message is used to indicate information associated with the first configuration.

In the embodiment of the disclosure, the fourth message includes at least one of: a QoS flow ID, a side link bearer ID, a logical channel ID, a QoS attribute, a transmission parameter configuration or a transmission mode configuration.

In the embodiment of the disclosure, the mapping relationship from the data of the first UE to the QoS flow may be determined by the core network element or by the second UE. The mapping relationship from the QoS flow of the first UE to the side link bearer may be determined by the access network element or by the second UE. The mapping relationship from the data of the first UE to the radio link bearer may be determined by the access network element or the core network element, or may be determined by the second UE. Each of the above-mentioned mapping relationships may be determined by the access network element and/or the core network element, or may be determined by the second UE, or may be determined by the second UE in cooperation with the access network element and/or the core network element. The following are examples of the mapping relationships determined by the second UE in cooperation with the access network element and/or the core network element. For example, the core network element determines the mapping relationship from the data of the first UE to the QoS flow, and the second UE determines the mapping relationship from the QoS flow of the first UE to the side link bearer.

Herein, when the core network element determines the mapping relationship from the data to the QoS flow, the mapping relationship is the same for all of the UEs. It can be understood that the mapping relationship of the data from the first UE to the QoS flow determined by the core network element is the same as the mapping relationship from the data of the second UE to the QoS flow determined by the core network element.

In some embodiments, the mapping relationship corresponding to the data that satisfies the second condition is determined by the second UE. Optionally, the second condition includes at least one of: a PSID, an ITS-AID, a QoS attribute, or a QoS flow ID. For example, the mapping relationship corresponding to the data for which the PSID is a preset value is determined by the second UE.

It should be noted that, in the embodiment of the disclosure, the access network element is a base station, such as a gNB or an eNB. The core network element is an AMF entity, a PCF entity, a V2X entity, or an entity.

Herein, the mapping relationship from the data of the first UE to the QoS flow, the mapping relationship from the QoS flow of the first UE to the side link bearer, and the mapping relationship from the data of the first UE to the radio link bearer may all be determined at least based on the PSID/ITS-AID and/or the QoS attribute of the first UE. Of course, the above-mentioned mapping relationships may be also determined based on a combination of any one or more of other factors of the first UE, such as the target address, the source address, or the transmission mode configuration.

In some embodiments, the method further includes Step 300c.

At Step 300c, the second UE establishes or restores an RRC connection.

It should be noted that the order of execution for Step S300a, Step S300b and Step S300c is not limited in the embodiment of the disclosure. Step S300a may be performed firstly, and then Step S300b and Step S300c are performed. Or Step S300b may be performed firstly, and then Step S300a and Step S300c are performed. Or other orders of execution formed by a combination of Step S300a, Step S300b, and Step S300c may be performed.

The method for processing data provided by the present disclosure are described below according to different embodiments.

The First Embodiment

At Step S401, the first UE maps the data to the QoS flow at the V2X layer based on the PSID and the QoS attribute according to the NAS signaling transmitted by the PCF.

Herein, the NAS signaling carries a first configuration, and the first configuration is to indicate the mapping of the data to the QoS flow based on the PSID and the QoS attribute.

Optionally, for data with a specific PSID and QoS attribute, the data is mapped to the default QoS flow.

At Step S402, the first UE transmits, to the access layer, the mapping relationship from the QoS flow ID to the parameter.

Herein, the parameter includes at least one of: a QoS attribute, a transmission parameter configuration, or a transmission mode configuration.

At Step S403, the first UE maps the QoS flow to the side link bearer at the access layer according to the RRC signaling transmitted by the gNB.

Herein, the RRC signaling carries a first configuration, and the first configuration is to indicate the mapping of the QoS flow to the side link bearer.

Optionally, for the data with a specific QoS flow, the QoS flow is mapped to the default side link bearer.

The Second Embodiment

At Step S501, the first UE maps the data to the side link bearer at the V2X layer according to the NAS signaling transmitted by the PCF.

Herein, the NAS signaling carries a first configuration, and the first configuration is to indicate that the data is mapped to the side link bearer based on the PSID and the QoS attribute.

Optionally, for the data with a specific PSID and QoS attribute, the data is mapped to the default side link bearer.

At S502, the V2X layer transmits, to the access layer, the mapping relationship from the side link bearer ID to the parameter.

Herein, the parameter includes at least one of: a QoS attribute, a transmission parameter configuration, or a transmission mode configuration.

The Third Embodiment

At Step S601, the first UE maps the data to the side link bearer at the V2X layer according to the RRC signaling transmitted by the gNB.

Herein, the RRC signaling carries a first configuration, and the first configuration is to indicate that data is mapped to the side link bearer based on the QoS attribute.

Optionally, for the data with a specific QoS attribute, the data is mapped to the default side link bearer.

The Fourth Embodiment

At Step S701, the first UE transmits the information associated with the QoS to the second UE, and the second UE transmits the information associated with the QoS to the access network element and the core network element.

Optionally, the access network element is a gNB, and the core network element is an AMF or a PCF.

At Step S702, the access network element and the core network element transmit a signaling to the second UE, and the signaling carries the first configuration.

At Step S703, the second UE transmits the first configuration to the first UE.

Optionally, the second UE transmits the first configuration to the first UE through the PC5-RRC signaling or the SDAP header.

At Step S704, the first UE maps the data to the QoS flow at the V2X layer according to the first configuration.

Optionally, for the data with a specific PSID and QoS attribute, the data is mapped to the default QoS flow.

At Step S705, the V2X layer transmits, to the access layer, the mapping relationship from the QoS flow ID to the parameter.

Herein, the parameter includes at least one of: a QoS attribute, a transmission parameter configuration, or a transmission mode configuration.

At Step S706, the first UE maps the QoS flow to the side link bearer at the access layer according to the first configuration.

Optionally, for the data with a specific QoS flow, the QoS flow is mapped to the default side link bearer.

The Fifth Embodiment

At Step S801, the first UE maps the data to the QoS flow at the V2X layer according to the NAS signaling transmitted by the PCF.

Herein, the NAS signaling carries a first configuration, and the first configuration is to indicate the mapping of the data to the QoS flow based on the PSID and the QoS attribute.

Optionally, for data with a specific PSID and QoS attribute, the data is mapped to the default QoS flow.

At Step S802, the first UE transmits, to the access layer, the mapping relationship from the QoS flow ID to the parameter.

Herein, the parameter includes at least one of: a QoS attribute, a transmission parameter configuration, or a transmission mode configuration.

At Step S803, the first UE transmits the information associated with the QoS to the second UE, and the second UE transmits the information associated with the QoS to the gNB.

At Step S804, the gNB transmits the first configuration to the second UE.

At Step S805, the first UE maps the QoS flow to the side link bearer at the access layer according to the PC5-RRC signaling transmitted by the second UE or according to the first configuration carried in the SDAP header.

Herein, the first configuration is to indicate the mapping of the QoS flow to the side link bearer.

Optionally, for the data with a specific QoS flow, the QoS flow is mapped to the default side link bearer.

The embodiment of the disclosure also provides a first User Equipment (UE). The first User Equipment (UE) 900, as shown in FIG. 4, includes:

a first processing unit 901 configured to map data to a QoS flow or to a side link bearer according to a first configuration.

In the embodiment of the disclosure, the first processing unit 901 is configured to map data to a corresponding QoS flow at a V2X layer according to the first configuration.

In the embodiment of the disclosure, the first User Equipment (UE) further includes: a first transmitting unit 902 configured to transmit a first information to an access layer, wherein the first information at least includes an identification associated with the QoS flow.

In the embodiment of the disclosure, the first User Equipment (UE) further includes: a second transmitting unit 903 configured to transmit a first information to an access layer, wherein the first information at least includes a corresponding relationship between the QoS flow and at least one of: a QoS attribute, a transmission parameter configuration, a transmission mode configuration, a resource address or a target address.

In the embodiment of the disclosure, the first processing unit 901 is further configured to map the QoS flow to a corresponding side link bearer at an access layer.

In the embodiment of the disclosure, the first processing unit 901 is configured to map the data to a corresponding side link bearer at a V2X layer according to the first configuration.

In the embodiment of the disclosure, the first User Equipment (UE) further includes: a third transmitting unit 904 configured to transmit a second information to an access layer, the second information at least includes an identification associated with the side link bearer.

In the embodiment of the disclosure, the first User Equipment (UE) further includes: a fourth transmitting unit 905 configured to transmit a second information to an access layer, the second information at least includes a corresponding relationship between the side link bearer and at least one of:

a QoS attribute, a transmission parameter configuration, a transmission mode configuration, a resource address or a target address.

In the embodiment of the disclosure, the first processing unit 901 is configured to map the data to a corresponding side link bearer at an access layer according to the first configuration.

In the embodiment of the disclosure, the first configuration is obtained through at least one of the following:

being preconfigured by the first UE; being transmitted by an access network element; being transmitted by a core network element; or being transmitted by a second UE.

In the embodiment of the disclosure, the access network element is a base station. The core network element is an AMF entity, a PCF entity, a V2X entity or a MME entity.

In the embodiment of the disclosure, the first User Equipment (UE) further includes: a fifth transmitting unit 906 configured to transmit a first message to at least one of an access network or a core network, wherein the first message is to indicate information associated with the first UE.

In the embodiment of the disclosure, the first message includes at least one of: a PSID/an ITS-AID, a source address, a target address, a QoS attribute, a QoS flow ID, a transmission parameter configuration or a transmission mode configuration.

In the embodiment of the disclosure, the first configuration is obtained through at least one of:

a RRC signaling, a PC5 RRC signaling, a PC5 signaling, a PC5 SDAP layer header, a PC5 SDAP layer signaling, or a NAS signaling.

In the embodiment of the disclosure, the input parameter of the first configuration includes at least one of:

a PSID/an ITS-AID, a source address, a target address, a QoS attribute, a transmission parameter configuration or a transmission mode configuration.

The output parameter of the first configuration includes at least one of:

a QoS flow ID, a side link bearer ID, a logical channel ID, a QoS attribute, a transmission parameter configuration or a transmission mode configuration.

In the embodiment of the disclosure, the first configuration is used to indicate a mapping relationship from the data to the QoS flow, wherein the mapping relationship is determined at least based on at least one of a PSID/an ITS-AID or a QoS attribute.

And/or, the first configuration is used to indicate a mapping relationship from the QoS flow to the side link bearer.

And/or, the first configuration is used to indicate a mapping relationship from the data to the side link bearer, wherein the mapping relationship is determined at least based on at least one of a PSID/an ITS-AID or a QoS attribute.

And/or, the first configuration is used to indicate the mapping of the data that satisfies a first condition to at least one of the first QoS flow or the first side link bearer.

In the embodiment of the disclosure, the first condition includes at least one of: a PSID, an ITS-AID, a QoS attribute or a QoS flow ID.

The embodiment of the disclosure also provides a second User Equipment (UE). The second User Equipment (UE) 1000, as shown in FIG. 5, includes:

a sixth transmitting unit 1001 configured to transmit a first configuration to a first UE, wherein the first configuration is for the first UE to map data to a QoS flow or to a side link bearer.

In the embodiment of the disclosure, the sixth transmitting unit 1001 is further configured to transmit a third message to at least one of an access network element or a core network element, w % herein the third message is used to indicate information associated with the first UE.

In the embodiment of the disclosure, the third message includes at least one of:

a PSID/an ITS-AID, a source address, a target address, a QoS attribute, a QoS flow ID, a transmission parameter configuration or a transmission mode configuration.

The third message is for the core network element to determine a mapping relationship from the data of the first UE to the QoS flow; and/or the third message is for the access network element to determine a mapping relationship from the QoS flow of the first UE to the side link bearer.

In the embodiment of the disclosure, the second User Equipment (UE) further includes: a first receiving unit 1002 configured to receive a fourth message transmitted by at least one of an access network element or a core network element, wherein the fourth message is used to indicate information associated with the first configuration.

The fourth message includes at least one of: a QoS flow ID, a side link bearer ID, a logical channel ID, a QoS attribute, a transmission parameter configuration or a transmission mode configuration.

In the embodiment of the disclosure, the second User Equipment (UE) further includes: a second receiving unit 1003 configured to receive a mapping relationship from the QoS flow of the first UE to the side link bearer, the mapping relationship being transmitted by an access network element.

In the embodiment of the disclosure, the second User Equipment (UE) further includes: a third receiving unit 1004 configured to receive a mapping relationship from the data to the radio link bearer, the mapping relationship being transmitted by an access network element and being determined at least based on at least one of a PSID/an ITS-AID or a QoS attribute of the first UE.

In the embodiment of the disclosure, the second User Equipment (UE) further includes: a fourth receiving unit 1005 configured to receive a mapping relationship from the data to the side link bearer, the mapping relationship being transmitted by a core network element and being determined at least based on at least one of a PSID/an ITS-AID or a QoS attribute of the first UE.

In the embodiment of the disclosure, the second User Equipment (UE) further includes: a fifth receiving unit 1006 configured to receive a mapping relationship from the data of the first UE to the QoS flow, the mapping relationship being transmitted by a core network element and being determined at least based on at least one of a PSID/an ITS-AID or a QoS attribute of the first UE.

In the embodiment of the disclosure, the second User Equipment (UE) further includes: a second processing unit 1007 configured to determine a mapping relationship from the data to the QoS flow, and/or to determine a mapping relationship from the QoS flow to the side link bearer.

In the embodiment of the disclosure, the mapping relationship corresponding to the data that satisfies the second condition in the first configuration is determined by the second processing unit 1007. The second condition includes at least one of: a PSID, an ITS-AID, a QoS attribute, or a QoS flow ID.

In the embodiment of the disclosure, the access network element is a base station. The core network element is an AMF entity, a PCF entity, a V2X entity or a MME entity.

In the embodiment of the disclosure, an input parameter of the first configuration includes at least one of:

a PSID/an ITS-AID, a source address, a target address, a QoS attribute, a transmission parameter configuration or a transmission mode configuration.

An output parameter of the first configuration includes at least one of:

a QoS flow ID, a side link bearer ID, a logical channel ID, a QoS attribute, a transmission parameter configuration or a transmission mode configuration.

In the embodiment of the disclosure, the first configuration is used to indicate a mapping relationship from the data to the QoS flow, wherein the mapping relationship is determined at least based on at least one of a PSID/an ITS-AID or a QoS attribute.

And/or, the first configuration is used to indicate a mapping relationship from the QoS flow to the side link bearer.

And/or, the first configuration is used to indicate a mapping relationship from the data to the side link bearer, wherein the mapping relationship is determined at least based on at least one of a PSID/an ITS-AID or a QoS attribute.

And/or, the first configuration is used to indicate a mapping relationship from the data that satisfies the first condition to at least one of a first QoS flow or a first side link bearer.

In the embodiment of the disclosure, the first condition includes at least one of:

a PSID, an ITS-AID, a QoS attribute, or a QoS flow ID.

In the embodiment of the disclosure, the second User Equipment (UE) further includes: a third processing unit 1008 configured to establish or restore a RRC connection.

The embodiments of the disclosure further provide a first User Equipment (UE), including a processor and a memory configured to store a computer program executable on the processor, wherein the processor is configured to perform, when the computer program is executed, steps of the method for processing data performed by the above-mentioned first User Equipment (UE).

The embodiments of the disclosure further provide a second User Equipment (UE), including a processor and a memory configured to store a computer program executable on the processor, wherein the processor is configured to perform, when the computer program is executed, steps of the method for processing data performed by the above-mentioned second User Equipment (UE).

Figure 6:
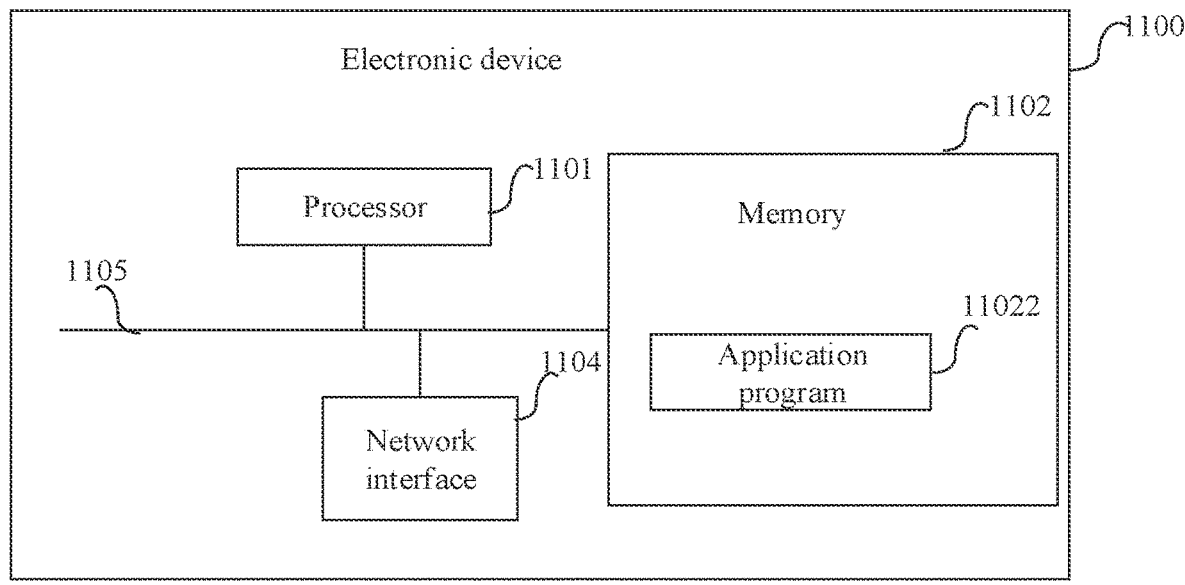
FIG. 6 is a schematic structure diagram of the hardware of an electronic device according to an embodiment of the disclosure.

FIG. 6 is a schematic structure diagram of the hardware of an electronic device (network device or terminal device) according to an embodiment of the disclosure. The electronic device 1100 includes: at least one processor 1101, a memory 1102 and at least one network interface 1104. The respective components of the electronic device 1100 are coupled together via the bus system 1105. It is to be understood that the bus system 1105 is for implementing the connection and communication among the components. In addition to the data bus, the bus system 1105 further includes a power bus, a control bus, and a status signal bus. However, for clarity, the various bus are marked as the bus system 1105 in FIG. 6.

It can be understood that the memory 1102 may be a volatile memory or a nonvolatile memory, or may include both the volatile memory and nonvolatile memory. The nonvolatile memory may be a ROM, a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a Flash Memory, a magnetic surface storage, a Compact Disk (CD), or a Compact Disc Read-Only Memory (CD-ROM). The magnetic surface storage may be a disk storage or a magnetic tape storage. The volatile memory may be a Random Access Memory (RAM), and is used as an external high-speed cache. Exemplarily but unrestrictively, RAMs in various forms may be adopted, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate SDRAM (DDRSDRAM), an Enhanced SDRAM (ESDRAM), a SyncLink DRAM (SLDRAM) and a Direct Rambus RAM (DRRAM). The memory 1102 described in the embodiments of the disclosure is intended to include, but not limited to, memories of such types and any other proper types.

The memory 1102 in the embodiments of the disclosure is to store various types of data so as to support the operation of the electronic device 1100. Exemplarily, such data includes any computer programs for executing in the electronic device 1110, such as an application program 11022. The program for implementing the methods of the embodiments of the disclosure may be included in the application program 11022.

The methods disclosed in the above-mentioned embodiments of the disclosure may be applied to the processor 1101 or implemented by the processor 1101. The processor 1101 may be an integrated circuit with signal processing capabilities. During implementing the foregoing methods, the steps of the foregoing methods can be accomplished by integrated logic circuits in the form of hardware or by instructions in the form of software in the processor 1101. The foregoing processor 1101 may be a general-purpose processor, a Digital Signal Processor (DSP), or another programmable logic device, a discrete gate, a transistor logic device, a discrete hardware component, or the like. The processor 1101 may implement or perform the various methods, steps, and logical block diagrams described in the embodiments of the disclosure. The general-purpose processor may be a microprocessor, any conventional processors or the like. The steps of the methods described in combination with the embodiments of the disclosure may be directly performed by the hardware decoding processor or be performed by the combination of hardware and software modules in the decoding processor. The software modules may be located in a storage medium in the memory 1102. The processor 1101 reads the information in the memory 1102, and implements the steps of the foregoing methods in combination with its hardware.

In an exemplary embodiment, the electronic device 1100 may be implemented through one or more Application Specific Integrated Circuit (ASIC), DSP, Programmable Logic Device (PLD), Complex Programmable Logic Device (CPLD), FPGA, general-purpose processor, controller, MCU, MPU, or other electronic components, to perform the aforementioned methods.

The embodiment of the disclosure also provides a computer-readable storage medium for storing a computer program.

Optionally, the computer-readable storage medium may be applied to the first User Equipment (UE) in the embodiments of the disclosure, and the computer program causes the computer to perform the corresponding processes implemented by the first User Equipment (UE) in each of the methods in the embodiments of the disclosure, which are not elaborated herein for the sake of simplicity.

Optionally, the computer-readable storage medium may be applied to the second User Equipment (UE) in the embodiments of the disclosure, and the computer program causes the computer to perform the corresponding processes implemented by the second User Equipment (UE) in each of the methods in the embodiments of the disclosure, which are not elaborated herein for the sake of simplicity.

The disclosure is described with reference to flowcharts and/or block diagrams of the methods, devices (systems), and computer program products according to the embodiments of the disclosure. It is to be understood that each of the processes and/or blocks in the flowcharts and/or block diagrams, and the combination of the processes and/or blocks in the flowcharts and/or block diagrams may be implemented through computer program instructions. The computer program instructions may be provided to the processor of a general-purpose computer, a special-purpose computer, an embedded processor, or other programmable data processing devices to produce a machine, such that the instructions executed by the processor of the computer or of other programmable data processing devices can produce a module for implementing the functions specified in one or more processes of the flowchart and/or in one or more blocks of the block diagram.

These computer program instructions may be also stored in a computer-readable memory that can direct a computer or other programmable data processing devices to operate in a particular manner, such that the instructions stored in the computer-readable memory produce a manufacture including the instruction device. The instruction device implements the functions specified in one or more processes of the flowcharts and/or in one or more blocks of the block diagrams.

The computer program instructions may be also loaded into a computer or other programmable data processing devices, such that a series of operation steps are performed on the computer or other programmable devices to produce the computer-implemented processes, and further the instructions executed on the computer or other programmable devices provide steps for implementing the functions specified in one or more processes of the flowcharts and/or in one or more blocks of the block diagrams.

The above are only preferred embodiments of the disclosure and are not intended to limit the scope of protection of the disclosure. Any modifications, replacements or improvements within the spirit and principles of the disclosure shall fall within the scope of protection of the disclosure.

The invention claimed is:

1. A method for processing data, comprising:
mapping, by a first User Equipment (UE), data to a Quality of Service (QoS) flow at a Vehicle to Everything (V2X) layer according to a first configuration;
transmitting, by the first UE, a first information to an access layer, wherein the first information at least comprises an identification associated with the QoS flow, and wherein the first information at least comprises a corresponding relationship between the QoS flow and a QoS attribute, wherein the corresponding relationship is indicative of that the QoS attribute is a V2X quality indicator (VQI), wherein the corresponding relationship indicates that the QoS flow is acquired based on the QoS attribute, and wherein the QoS attribute is an input parameter of the first configuration; and
transmitting, by the first UE, a first message to an access network, wherein the first message includes a transmission mode configuration, wherein the first message further comprises at least one of a target address and a QoS attribute.

2. The method of claim 1, wherein the first configuration is obtained from a core network element.

3. The method of claim 1, wherein the first message is used to indicate information associated with the first UE, and wherein the transmission mode configuration includes a transmission profile, and wherein the transmission profile indicates a broadcast mode, a multicast mode, or a unicast mode.

4. The method of claim 1, wherein the first configuration is obtained through a Non-Access Stratum (NAS) signaling.

5. The method of claim 1, wherein the input parameter of the first configuration comprises a Provider Service Identifier (PSID)/an Intelligent Transport System-Application Identification (ITS-AID).

6. The method of claim 1, wherein an output parameter of the first configuration comprises at least one of:
a QoS flow ID, a side link bearer ID, a logical channel ID, the QoS attribute, or a transmission parameter configuration.

7. The method of claim 1, wherein the first configuration is used to indicate a mapping relationship from the data to the QoS flow, wherein the mapping relationship is determined at least based on at least one of a Provider Service Identifier (PSID)/an Intelligent Transport System-Application Identification (ITS-AID) or the QoS attribute.

8. A method for processing data, comprising:
transmitting, by a second User Equipment (UE), a first configuration to a first UE, wherein the first configuration is used by the first UE to map data to a Quality of Service (QoS) flow, wherein the first UE transmits a first information to an access layer, wherein the first information at least comprises an identification associated with the QoS flow; and
transmitting, by the first UE, a first message to an access network, wherein the first message includes a transmission mode configuration;
wherein the first information at least comprises a corresponding relationship between the QoS flow and a QoS attribute,
wherein the corresponding relationship is indicative of that the QoS attribute is a V2X quality indicator (VQI),
wherein the corresponding relationship indicates that the QoS flow is acquired based on the QoS attribute, and
wherein the QoS attribute is an input parameter of the first configuration.

9. The method of claim 8, wherein the input parameter of the first configuration comprises a Provider Service Identifier (PSID), and wherein the transmission mode configuration includes a transmission profile, and wherein the transmission profile indicates a broadcast mode, a multicast mode, or a unicast mode.

10. A first User Equipment (UE), comprising:
a processor, configured to map data to a Quality of Service (QoS) flow at a Vehicle to Everything (V2X) layer according to a first configuration; and
a transceiver, configured to transmit a first information to an access layer, wherein the first information at least comprises an identification associated with the QoS flow, wherein the transceiver is further configured to transmit a first message to an access network, wherein the first message includes a transmission mode configuration,
wherein the first information at least comprises a corresponding relationship between the QoS flow and a QoS attribute,
wherein the corresponding relationship is indicative of that the QoS attribute is a V2X quality indicator (VQI),
wherein the corresponding relationship indicates that the QoS flow is acquired based on the QoS attribute, and
wherein the QoS attribute is an input parameter of the first configuration.

11. The first UE of claim 10, wherein the first configuration is obtained from a core network element.

12. The first UE of claim 10, wherein the first message is used to indicate information associated with the first UE, and wherein the transmission mode configuration includes a transmission profile, and wherein the transmission profile indicates a broadcast mode, a multicast mode, or a unicast mode.

13. The first UE of claim 10, wherein the first configuration is obtained through a Non-Access Stratum (NAS) signaling.

14. The first UE of claim 10, wherein the input parameter of the first configuration comprises a Provider Service Identifier (PSID).

15. The first UE of claim 10, wherein an output parameter of the first configuration comprises at least one of:
a QoS flow ID, a side link bearer ID, a logical channel ID, the QoS attribute, or a transmission parameter configuration.

16. The first UE of claim 10, wherein the first configuration is used to indicate a mapping relationship from the data to the QoS flow, wherein the mapping relationship is determined at least based on at least one of a Provider Service Identifier (PSID)/an Intelligent Transport System-Application Identification (ITS-AID) or the QoS attribute.

* * * * *